United States Patent Office 2,943,017
Patented June 28, 1960

2,943,017
FUNGICIDAL SULFONYL-BENZOTRIAZOLE

Klaus Sasse and Richard Wegler, Koln-Stammheim, and Ferdinand Grewe, Leverkusen, Germany, assignors to Farbenfabriken Bayer Aktiengesellschaft, Leverkusen, Germany, a corporation of Germany No Drawing. Filed Apr. 8, 1958, Ser. No. 727,044

16 Claims. (Cl. 167—33)

The present invention relates to and has as its objects fungicidal compositions and a method of combating fungi or protecting plants against fungi attack which comprises treating the plants infested or to be protected with a compound of the following formula

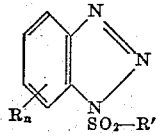

wherein R stands for hydrogen, alkyl, aralkyl, a heterocyclic residue, for OH, OR, SH, SR, O-acyl, S-acyl, $H_2N-NH$, $N(R)_2$, NH-acyl, halogen or $NO_2$, and R' is a possibly substituted alkyl-, $N(R')_2$-, or OR'-residue, and $n$ is an integer from 1 to 4, or with compositions containing this compound as an active ingredient.

The protection of plants from attacks by noxious fungi is of great economic importance. However, the number of fungicides which are practically useful for this purpose in spite of great efforts, is still comparatively small. Almost all fungicides have partial defects in that they are either not sufficiently plant-compatible at higher concentrations or not sufficiently resistant to weather conditions such as intensive sun irradiation or prolonged damp weather, particularly at elevated temperatures. Other fungicides are only specifically active thus necessitating a completion by or combination with further fungicides.

Only a few compounds have so far become known which are sufficiently active on living plants against fungoid pests such as Phytophthora infestands, Fusicladium (Venturia), Peronospora (Plasmopara), Septoria, Cladosporium fulvum, Alternaria solani, etc., and at the same time cause no damage to the treated plants. Many compounds known hitherto show other disadvantages such as strong coloration or unpleasant odor. In conditions of moist warmth these properties are especially noticeable. Other fungicidal substances are unsuitable on account of the too great amount needed for their practical application, so that shortcomings exist among compounds with a fungicidal action on the plants.

A class of organic compounds has now been found, which possess outstanding activity as plant fungicides, without possessing the aforesaid disadvantages. These compounds are benzotriazoles substituted at the nitrogen by sulfonyl residues, of the above formula, which can be produced according to known processes from benzotriazole or its nuclear substitution derivatives, in aqueous alkali solution or in indifferent solvents by the addition of acid-binding agents, with alkyl-, aryl, or aralkyl-sulfochlorides, chlorosulfonic acid amides or chlorosulfonic esters. They are also obtainable from the alkali metal compounds of the benzotriazoles and the corresponding sulfochlorides in indifferent solvents.

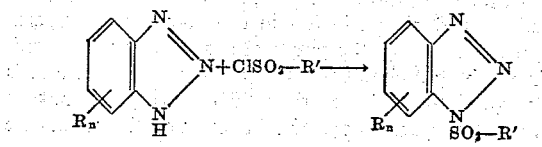

The symbols in these formulae have the same significance as given above.

A further way of producing these compounds consists in the reaction of an o-phenylene diamine mono-sulfochloride with a compound corresponding to the formula H-R' and finally reacting with nitrous acid:

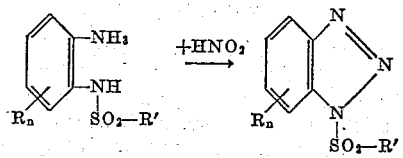

The symbols in these formulae again have the same significance as given above.

The benzotriazoles substituted by alkyl sulfonyl groups have shown themselves to be especially active as fungicides.

The compounds of the present invention are preferably applied to plants by means of spraying. Spraying of the plants to be treated is preferably performed with aqueous emulsions or suspensions of the active ingredients. Aqueous emulsions or suspensions containing from about 0.01% to about 1% by weight and preferably from about 0.05% to about 0.5% by weight of the active ingredient are practically suitable. If spraying is effected with much smaller quantities of liquid as in low volume spraying higher concentrations of the active ingredients should be employed. If desired a certain amount of a wetting agent can be added to form a suspension of the active ingredient. Any of the conventional wetting agents such as those of anionic, cationic or nonionic type can be employed. Practically suitable, however, are such wetting agents which are of nonionic type, for instance a polyglycol ether of a benzyl hydroxy diphenyl which may contain from about 12 to 15 glycol radicals. But also other polyethylene glycol ethers of generally alkylated phenols are of same advantage to bring the compounds of the present invention in the form of a suitable emulsion. Preferably concentrated compositions composing the active ingredient of the present invention and a suitable wetting agent are prepared at first, sometimes also by means of a suitable trisolvent such as the dimethyl formamide or acetone. This concentrate then is dispersed in water just prior to use.

A further form in which fungicidal compounds of the present invention may be applied consists of solutions of the active ingredients in other suitable inert liquid or same solid diluents in which the active ingredient is present preferably in molecularly dispersed form. The form in which the agents to be employed are applied to the object treated depends largely on the nature of the object and the purpose of the application.

Suitable inert solvents for the manufacture of liquid preparations should not be readily inflammable, as odorless as possible and without toxic effects on humans and animals when properly used. Neither should they have a corrosive effect on the components of the preparations or the material of the storage containers. Examples of such suitable solvents are for instance high-boiling oils such as oils of vegetable origin such as castor oil, and lower-boiling solvents with a flash point of say about 30° C. such as carbon tetrachloride, ethylene dichloride, ethane tetrachloride, hydrated naphthalene, alkylated naphthalene, solvent naphtha etc. Mixtures of solvents may of course also be used.

The compounds of the present invention can also be applied to plants in the form of dusts, utilizing as the inert vehicle such materials as tricalcium phosphate, precipitated chalk, bentonite, kaolin, kieselghur, and the like, Also cork powder, wood powder and the like may be used, but in these cases it is advisable to add wetting agents.

The active substances in question may also be used in the form of aerosols. For this purpose the active ingredient must be dissolved or dispersed in a solvent boiling below room temperature at atmospheric pressure.

The invention is illustrated by the following examples which are not to be considered as limiting the specification and claims in any manner.

*Example 1*

35.7 grams of benzotriazole are dissolved in a solution of 12 grams of sodium hydroxide in 300 millilitres of water and treated at room temperature and with stirring, with a solution of 34.3 grams methane-sulfochloride in 50 millilitres of acetone. The mixture is then stirred for 1 hour at room temperature. The crystals which separate are filtered off with suction and washed with water. The yield of practically pure 1-methane sulfonyl benzotriazole amounts to 46.5 grams (=78.6 of the theoretical). It possesses, when recrystallized from alcohol, a melting point of 113–114° C.

In an analogous or similar manner the following can be obtained:

1-(dimethyl amino sulfonyl)-benzotriazole, M.P. 82–83° C. (from ligroin)
1-(methane sulfonyl)-5-(or 6-)-nitrobenzotriazole, M.P. 137–138° C. (from alcohol)
1-(methanesulfonyl)-5-(or 6-)-chlorobenzotriazole, M.P. 113–115° C. (from alcohol)
1-chlormethane sulfonyl-benzotriazole, M.P. 92–93° C. (from alcohol)
1-methane sulfonyl-5-methyl-benzotriazole, M.P. 100–102° C. (from alcohol)
1-methane sulfonyl-5-chlor-benzotriazole, M.P. 113–115° C. (from alcohol)
1-methane sulfonyl-5-nitro-benzotriazole, M.P. 137–138° C. (from alcohol)
1-methane sulfonyl-5-carbethoxy-benzotriazole (from 5-carbethoxy-benzotriazole of M.P. 108–109° C.), M.P. 170° C. (from alcohol)
1-methane sulfonyl-5-carboxy-benzotriazole, M.P. 125–128° C. (from acetic ester ligroin)

*Example 2*

13.3 grams of 5-methyl-benzotriazole are dissolved in a solution of 4 grams of sodium hydroxide in 150 millilitres of water. There are added while stirring dropwise 11.5 grams of methane sulfochloride in 50 millilitres of acetone. The crystals which precipitate are separated by filtering with suction and recrystallized from alcohol. Yield: 12 grams=57% of the theoretical of 1-methane-sulfonyl-5-methyl-benzotriazole, M.P. 101–102° C.

*Example 3*

To a solution of 33.6 grams of 4-methoxy-2-nitraniline in 200 millilitres of pyridine there are added slowly while stirring and cooling 23 grams of methane sulfochloride. The mixture is stirred for half an hour at room temperature and then 2 hours at 90° C. The solvent is distilled off and the residue is taken up in diluted sodium hydroxide. This solution is treated once with a small amount of ether, and then acidified. The crystals which separate are filtered with suction and recrystallized from benzene. Yield: 30 grams of methane sulfo-(2-nitro-4-methoxy)-anilide, M.P. 123–124° C.

21.6 grams of methane sulfo-(2-nitro-4-methoxy)-anilide are suspended in 170 millilitres of 5% acetic acid and treated while stirring with small portions of in toto 35 grams of iron powder. After having added 7 grams of iron the reaction temperature is adjusted to 90° C. After 1 hour reaction at this temperature, the mixture is made alkaline and filtered with suction. The solution is neutralized and the resulting crystals are separated by filtration with suction. Yield: 16 grams of methane sulfo-(2-amino-4-methoxy)-anilide, M.P. 141–152° C.

10.05 grams of methane sulfo-(2-amino-4-methoxy)-anilide are suspended in a mixture of 25 millilitres of glacial acetic acid and 15 millilitres of water. While cooling with ice and stirring there are added below 5° C. 3.5 grams of sodium nitrate in 10 millilitres of water. The temperature is allowed to rise slowly, i.e. to about 40 to 50° C. After 1 hour the suspension is filtered with suction and the remaining crystals are recrystallized from alcohol. Yield: 8 grams=70.5% of the theoretical of 1-methane sulfonyl-5-methoxy-benzotriazole, M.P. 148–149° C.

By the same way can be obtained 1-chloromethane sulfonyl-5-methoxy-benzotriazole, M.P. 130°–131° C. (from alcohol.)

*Example 4*

In vivo, on the green plants, the inventive compounds have very high fungicidal activity and exceed that for example of zinc ethylene-bis-dithiocarbamate recommended hitherto against *Phytophthora infestans* on potatoes and tomatoes, as is evident from the following experimental results.

Potato plants (Dutch Early/*Phytophthora infestans*) were treated with the preparations given in the following tables. The solutions have been prepared as follows: the active ingredient has been mixed with ten times the amount of acetone, whereafter 200% by weight referred to active ingredient of benzyl hydroxy diphenyl polyglycol ether containing about between 10 and 15 glycol residues have been added. This premixture has been diluted with water to the concentration indicated in the table below. Twenty-four hours after spraying the plants were artificially infected with *Phytophthora-conidia* and incubated in a moist chamber at 18–20° C. Seven days after infection they were evaluated, when the untreated controls were heavily attacked by the disease. The degree of attack of the treated plants was expressed in percent of the attack of the untreated controls.

EXPERIMENT 1

Potatoes, Dutch Early/*Phytophthora infestans*. Degree of attack at a concentration of active agents of:

| preparation | 0.1% | 0.05% | 0.025% |
| --- | --- | --- | --- |
| N-methane-sulfonyl-benzotriazole | 0 | 5 | 31 |
| zinc ethylene-bisdithiocarbamate | | 21 | 43 |
| control | | 100 | |

EXPERIMENT 2

Potatoes, Dutch Early/*Phytophthora infestans*. Degree of attack at a concentration of active agent of:

| preparation | 0.1% | 0.05% |
| --- | --- | --- |
| 1-methane sulfonyl-5-chlorbenzotriazole | 3 | 38 |
| zinc-ethylene-bisdithiocarbamate | 10 | 30 |
| control | | 100 |

EXPERIMENT 3

Tomato plants (Bonny best) of about 6 inches height, planted in pots of about 4 inches diameter in standard soil in the green house, are spread to the run off with suspensions which have been prepared as shown before.

The pots are placed for 24 hours at temperatures to 24° C. in an atmosphere of a humidity of 60 to 70% to allow the spray to dry. After that the plants are inoculated with conidia-susp. of *Phytophthora infestans* in aqua bidestilata and placed in humid chambers at a temperature of about 18° C. the plants are randomized. Humidity in the humid chambers is 100% for 48 hours, and is not allowed to be lower than 90% during the next 4 days. In toto after 6 days after inoculation the results are evaluated. Each pinna of the leaves of the plant has been evaluated by numbers 0 to 4; 0 means no damage, 4 means pinna completely destroyed, 1, 2 and 3 are intermediate values. Each pinna is multiplied with the evaluation number and the total of pinna then is summarized. The number thus obtained is divided through the number of pinna. The control number that means the status of the untreated plants has been set 100, and the status of treated plants has been numbered in percent of the aforementioned control value.

As test material for comparison there has been used zinc ethylene-bis-dithiocarbamate. From the results it is to be seen that the inventive compound is far more superior:

Tomatoes (Bonny best), *Phytophthora infestans*. Degree of attack at a concentration of active agent of:

| preparation | 0.1% | 0.05% | 0.025% |
|---|---|---|---|
| N-alkyl-sulfonyl-benzotriazole (mixture of alkyl=$C_2H_5$ to $C_4H_9$) | 0 | 13 | 17 |
| N-chlormethylsulfonyl-benzotriazole | 0 | 1 | 7 |
| zinc-ethylene-bisdithiocarbamate | 1.7 | 6 | 26 |
| control | | 100 | |

In addition to the fungi mentioned in the preceding tables, the inventive compound exhibits also activity against *Plasmopara viticola* (peronospora) on vine, *Septoria apii* on celery, and *Cladosporium fulvum* on tomatoes, which is superior to that of standard fungicides such as zinc ethylene-bis-dithiocarbamate, N-trichloro methylthiotetrahydro phthalimide, tetramethyl-thiuram-disulfide or copper-oxychloride.

EXPERIMENT 4

Tomatoes (Bonny best), *Phytophthora infestans*. Degree of attack at a concentration of active agent of:

| preparation | 0.1% | 0.05% | 0.025% |
|---|---|---|---|
| 1-methane sulfonyl-5-chlor-benzotriazole | 7 | 42 | 53 |
| zinc-ethylene-bisdithiocarbamate | 31 | 54 | 57 |
| control | | 100 | |

EXPERIMENT 5

Tomatoes (Bonny best), *Phytophthora infestans*, degree of attack at a concentration of active agent of:

| preparation | 0.1% | 0.05% | 0.025% |
|---|---|---|---|
| 1-chlormethane sulfonyl-5-methoxy-benzotriazole | 7 | 15 | 34 |
| zinc-ethylene-bisdithiocarbamate | 6 | 14 | 28 |
| control | | 100 | |

We claim:
1. A method of combating fungi which comprises treating living plants with a compound of the general formula

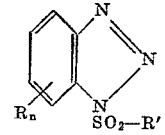

wherein R stands for a member selected from the group consisting of hydrogen, nitro, chloro, lower alkyl, carboxy-lower alkyl, carboxy, amino and lower alkoxy; R' is a member selected from the group consisting of lower alkyl, chloro-lower alkyl and lower alkylamino, and $n$ is an integer from 1 to 4.
2. The 1-methane-sulfonyl-benzotriazole.
3. The 1-dimethylamino-sulfonyl-benzotriazole.
4. The 1-methane-sulfonyl-5-nitro-benzotriazole.
5. The 1-methane-sulfonyl-6-nitro-benzotriazole.
6. The 1-methane-sulfonyl-5-chlor-benzotriazole.
7. The 1-methane-sulfonyl-6-chlor-benzotriazole.
8. The 1-chlormethane-sulfonyl-benzotriazole.
9. The 1-methane-sulfonyl-5-methyl-benzotriazole.
10. The 1-methane-sulfonyl-5-chlor-benzotriazole.
11. The 1-methane-sulfonyl-5-nitro-benzotriazole.
12. The 1-methane-sulfonyl-5-methoxy-benzotriazole.
13. The 1-methane-sulfonyl-5-carbethoxy-benzotriazole.
14. The 1-methane-sulfonyl-5-carboxy-benzotriazole.
15. The 1-chlormethane-sulfonyl-5-methoxy-benzotriazole.
16. A compound of the following formula

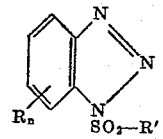

wherein R stands for a member selected from the group consisting of hydrogen, nitro, chloro, lower alkyl, carboxy-lower alkyl, carboxy amino and lower alkoxy; R' is a member selected from the group consisting of lower alkyl, chloro-lower alkyl and lower alkylamino, and $n$ is an integer from 1 to 4.

References Cited in the file of this patent
UNITED STATES PATENTS
2,806,035  Gysin et al. _____ Sept. 10, 1957

OTHER REFERENCES
Chem. Abst., vol. 47, 1953, pp. 11185–86, part 11186f. Benson et al.
Chem. Abst., vol. 26, 1932, pp. 114–5. Pollak et al.